United States Patent
Chapman et al.

(10) Patent No.: US 9,942,106 B2
(45) Date of Patent: Apr. 10, 2018

(54) NETWORK BROKER

(71) Applicant: Accenture Global Services Limited, Dublin (IE)

(72) Inventors: Christopher Chapman, London (GB); Zahra S. Bahrololoumi, London (GB); Matthew Sheppard, Surrey (GB); William A. Trotter, Reading (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 764 days.

(21) Appl. No.: 13/841,382

(22) Filed: Mar. 15, 2013

(65) Prior Publication Data

US 2014/0280940 A1 Sep. 18, 2014

(51) Int. Cl.
*H04L 12/24* (2006.01)
*H04L 29/06* (2006.01)
(Continued)

(52) U.S. Cl.
CPC .............. *H04L 41/50* (2013.01); *H04L 63/02* (2013.01); *H04L 67/2809* (2013.01);
(Continued)

(58) Field of Classification Search
CPC . H04L 67/2809; H04L 67/1025; H04L 41/50; H04L 63/02
See application file for complete search history.

(56) References Cited

U.S. PATENT DOCUMENTS 8,250,135 B2 * 8/2012 Driesen .................. G06Q 10/06
707/770
8,495,197 B1 * 7/2013 Nagargadde .......... G06F 9/5011
709/219

(Continued)

FOREIGN PATENT DOCUMENTS

EP 2 405 386 A2 1/2012

OTHER PUBLICATIONS

European Search Report issued in Application No. 13159650.4-1957 dated Aug. 21, 2013.

(Continued)

*Primary Examiner* — Thomas Dailey
*Assistant Examiner* — Aye M Aung
(74) *Attorney, Agent, or Firm* — Brinks Gilson & Lione (57) ABSTRACT

A network broker divides IP address space into subnets to allow IT infrastructure transfers using a cloud computing environment. A link established between a client and network broker allows transfer of data and provides connectivity between the client and cloud providers. IT infrastructure to be divested is provisioned onto subnets in a cloud environment. A second link is established via the network broker between the entity being divested and the provisioned IT infrastructure. Client access to provisioned IT infrastructure is cut by rerouting, at the network broker, traffic destined to the subnet(s) hosting the provisioned IT infrastructure from the link to the second link. After a new owner assimilates the divested IT infrastructure using the second (Continued)

link, network broker routing rules are adjusted to sever access of the new owner to the subnet(s) hosting the divested IT infrastructure and return access to the subnet(s) to the client.

16 Claims, 10 Drawing Sheets

(51) Int. Cl.
    *H04L 29/08*     (2006.01)
    *H04L 29/12*     (2006.01)

(52) U.S. Cl.
    CPC ...... *H04L 41/0813* (2013.01); *H04L 41/5096* (2013.01); *H04L 61/2007* (2013.01); *H04L 61/2038* (2013.01); *H04L 61/6068* (2013.01)

(56) References Cited

U.S. PATENT DOCUMENTS

| | | | |
|---|---|---|---|
| 2005/0074014 | A1 | 4/2005 | Rao et al. |
| 2010/0325261 | A1* | 12/2010 | Radhakrishnan ..... G06F 15/173 709/224 |
| 2010/0332262 | A1* | 12/2010 | Horvitz ................. G06F 9/5027 705/4 |
| 2011/0016214 | A1* | 1/2011 | Jackson ................ G06F 9/5044 709/226 |
| 2011/0055385 | A1* | 3/2011 | Tung ..................... G06F 9/5072 709/224 |
| 2011/0213712 | A1 | 9/2011 | Hadar et al. |
| 2011/0251937 | A1* | 10/2011 | Falk ........................ G06F 21/10 705/34 |
| 2012/0011190 | A1* | 1/2012 | Driesen ................. G06Q 10/06 709/202 |
| 2012/0116831 | A1 | 5/2012 | Greenspan et al. |
| 2013/0018693 | A1* | 1/2013 | Dubbels ................. G06Q 50/22 705/7.26 |
| 2014/0189124 | A1* | 7/2014 | Banatwala ............. H04L 63/20 709/226 |

OTHER PUBLICATIONS

Przemyslaw Pawluk et al, "Introducing STRATOS: A Cloud Broker Service", 2012 IEEE 5$^{th}$ International Conference on Cloud Computing, Jun. 24, 2012.

* cited by examiner

NETWORK BROKER

TECHNICAL FIELD

The present invention relates to a network broker. In particular, the invention relates to a network broker for the transfer of IT infrastructure from one party to another using cloud resources.

BACKGROUND OF THE INVENTION

Transactions between entities including IT infrastructure can be complex, especially where the IT infrastructure has been developed with standardised processes and centralised IT systems. Such transactions may take place as part of a merger, acquisition, divestment, or joint venture. Typically, to enable a transfer including IT infrastructure, specific hardware must be provided and set up in a location that can be separated from the divesting company's network in the future. This infrastructure allows the systems used or shared by the entity in the scope of the transaction to be replicated. The copy of the IT infrastructure is set up and hosted in a data centre. In order to allow continued access to and control of the IT infrastructure copy, new network connections for third party access must be authorised and set up, with the divesting entity's network during period leading up to completion of the transaction, and with the acquiring entity's network following completion. The procurement and set up of such specific hardware may be expensive, and often results in the entities inheriting system and infrastructure assets which are not needed or are unsuitable to support the IT strategy for the entities post-divestment. This also involves project teams being mobilised afresh to perform the implementation activities for each transaction and no re-use of resources or technical solutions between different transactions made by the divesting entity, which is expensive and time-consuming. There is typically also a need to provide service arrangements by the divesting entity, or the entity contributing to a joint venture, to enable the transaction to take place, which may involve the setting up of a link between the networks of the entities involved. Thus, such procedures for transactions including IT infrastructure can be expensive and time-consuming and lack technology or manpower efficiencies.

There is a need, therefore, for an alternative or improved process and system for effecting the transfer of IT infrastructure between transacting entities.

SUMMARY OF THE INVENTION

In accordance with a first aspect of the invention, there is provided a method of transferring access to computer resources from a first entity to a second entity, comprising: providing an intermediary entity having access to one or more cloud computer resources; providing a first network connection to the intermediary entity for the first entity to access the one or more cloud computer resources; provisioning the one or more cloud computer resources with first computer resources from the first entity using the first network connection to provide provisioned cloud computer resources; and providing a second network connection to the intermediary entity for the second entity to access the provisioned cloud computer resources.

Preferably, access to the provisioned cloud computer resources may be controlled by the intermediary entity.

Preferably, the intermediary entity has access to a plurality of cloud providers and the first entity is provided with access to the plurality of cloud providers using the first network connection to the intermediary entity.

Preferably, the first network connection connects the first entity to a first entity network portion of the intermediary entity. Advantageously, the first entity network portion comprises a plurality of first entity network addresses and the first entity provisions the one or more cloud computer resources with the first computer resources using a first network address of the plurality of first entity network addresses.

Preferably, the second network connection connects the second entity to a second entity network portion of the intermediary entity. Advantageously, the second entity is provided with access to the provisioned cloud computer resources by the intermediary entity transferring access to the first network address from the first entity network portion to the second entity network portion.

Preferably, access to the provisioned cloud computer resources is transferred from the first entity to the second entity by the intermediary entity providing a first firewall configuration between the first entity and the intermediate entity and providing a second firewall configuration between the second entity and the intermediary entity.

Advantageously, access of the first entity to the provisioned cloud computer resources is prevented using a firewall configuration between the first entity and the intermediary entity.

Preferably, when access to the provisioned cloud computer resources is no longer required, access to the first network address is transferred back from the second entity network portion to the first entity network portion.

Advantageously, the first entity may provision the one or more cloud computer resources with second computer resources using the first network connection to provide second provisioned cloud computer resources for transfer to a third entity.

Preferably, the first entity may separate and disconnect from the provisioned cloud computer resources while maintaining access using the first network connection to provision other existing or additional cloud computer resources.

In accordance with a further aspect of the invention, there is provided a system comprising an intermediary entity comprising a processor and a memory, the memory comprising instructions which when executed implement a method of transferring access to cloud computer resources from a first entity to a second entity, the method comprising: providing a first network connection to the intermediary entity for the first entity to access one or more cloud computer resources; receiving the first computer resources from the first entity using the first network connection; provisioning one or more cloud computer resources with the received first computer resources to provide provisioned cloud computer resources; and providing a second network connection to the intermediary entity for the second entity to access the provisioned cloud computer resources.

The memory may further comprise instructions which when executed implement any of the above, or below, method steps.

In accordance with a further aspect of the invention, there is provided a product comprising a computer readable memory with processor executable instructions stored thereon, wherein the instructions when executed by the processor cause the processor to carry out any of the above, or below, method steps.

In accordance with a further aspect of the invention, there is provided a method of controlling access to cloud computing resources comprising: provisioning with an intermediary entity one or more cloud computer resources to provide provisioned cloud computer resources; configuring a first network connection between a first entity and the intermediary entity; configuring a second network connection between a second entity and the intermediary entity; controlling the configurations of the first and second network connections to selectively provide access to the provisioned cloud computer resources to the first and second entities respectively.

Preferably, the configurations of the first and second network connections are controlled by the intermediary entity.

In accordance with another aspect of the invention, a method is provided comprising: dividing IP address space into a plurality of subnets usable by a client for a plurality of transactions to be conducted over a cloud computing environment; setting up a first link between the client and a network broker, the link being usable to transfer data destined to the IP address space and being used to provide connectivity between the client and a plurality of cloud providers through the network broker; provisioning IT infrastructure to be divested by the client onto one or more of the plurality of subnets in a cloud computing environment via the network broker; setting up a second link in parallel between the client and the network broker, the second link being usable to provide connectivity to the IT infrastructure to be divested by the client via the network broker to the cloud computing environment; severing access between the client and the IT infrastructure to be divested by rerouting, at the network broker, traffic destined to the one or more subnets hosting the IT infrastructure to be divested from the first link to the second link; providing access to a new owner of the divested IT infrastructure through the second link via the network broker; and upon completion of a divestment process, adjusting routing rules within the network broker to sever access of the new owner to the one or more subnets hosting the IT infrastructure that has been divested and to renew access for the client to the one or more subnets that now formerly hosted the IT infrastructure that has been divested.

Cloud infrastructure is an ideal resource to use to address the challenges of the background art, but enabling a divesting company to connect to multiple cloud resources and then selectively disconnect from them at the transaction date is very challenging. It could only previously be done by setting up multiple network connections (see detailed description, below). Embodiments of the invention provide an alternative solution that allows (i) a party to connect to multiple cloud resources (including resources from different providers) through the same network connection, and (ii) this party to then separate from and transfer specific cloud resources to another party, to enable a merger, acquisition, divestment, or joint venture.

Other preferred features and advantages of the invention are set out in the description and in the dependent claims which are appended hereto.

BRIEF DESCRIPTION OF THE DRAWINGS

The invention may be put into practice in a number of ways and some embodiments will now be described by way of non-limiting example only, with reference to the following figures, in which.

DETAILED DESCRIPTION

Cloud computing is known for providing remote computing resources for a user in a flexible, on-demand and scalable manner. There are a number of cloud providers, such as Amazon Web Services, Microsoft Azure, NTT, Terramark, and Rackspace. Different cloud providers may offer different products and services, which may require a different set of skills and credentials to provision, use, and manage. The IT policies of some users may prevent the use of certain ports and protocols over the internet, instead requiring a VPN (virtual private network) connection to be set up to allow secure use of a cloud resource. A user wishing to use cloud resources typically therefore needs to set up individual VPN connections between the user's network and each cloud provider and, in some cases, to each component of the cloud infrastructure hosted by a particular cloud provider. The setup and maintenance of each VPN connection has an administrative overhead associated with it and this can mean that it can take weeks and sometimes months for a user to be able to use new cloud services in compliance with company policies.

The provisioning of computer resources across multiple cloud providers and/or data centres is discussed in US 2011/0055399 A1. A tool for assessing suitability of a cloud computing environment and providing a strategy for such implementation is discussed in U.S. Pat. No. 7,987,262 B2. A graphical user interface for providing access to cloud computer resources provisioned across at least one cloud provider and/or at least one data centre is discussed in US 2011/0055712 A1. Each of these references referred to in this paragraph is incorporated herein by reference in its entirety and for all purposes.

The inventors considered the use of cloud services to enable the transfer of IT infrastructure as part of a transaction, in view of the fact that cloud services would be hosted separately from the networks and infrastructure of the parties to such transaction and that upfront investment in new hardware to enable the transfer would not be required. However, as explained above, the provision of cloud computer resources is between a cloud provider and a single user, over a given network connection. This presents a number of issues, especially in the context of mergers, acquisitions, divestments and joint venture transactions. Firstly, the setting up of a new network connection with a cloud provider each time a new transaction is to be made can take weeks to months to complete and therefore represent a considerable delay in the critical path of the transaction. Large companies can be typically involved in up to ten or more divestment, merger, acquisition, or joint venture, transactions at the same time, so such delays are a significant consideration. Secondly, once a suitable network connection has been set up between a cloud provider and a first transacting party (divesting party), there is no way for the first transacting party to disconnect from these cloud resources without impacting the businesses using them. The cloud resources should ideally be transferred to the second transacting party (acquiring party), but this is not possible because access is permitted between the cloud provider and the first party only. Thus, use of cloud resources for such transactions appeared not to be practicable.

Figure 1:
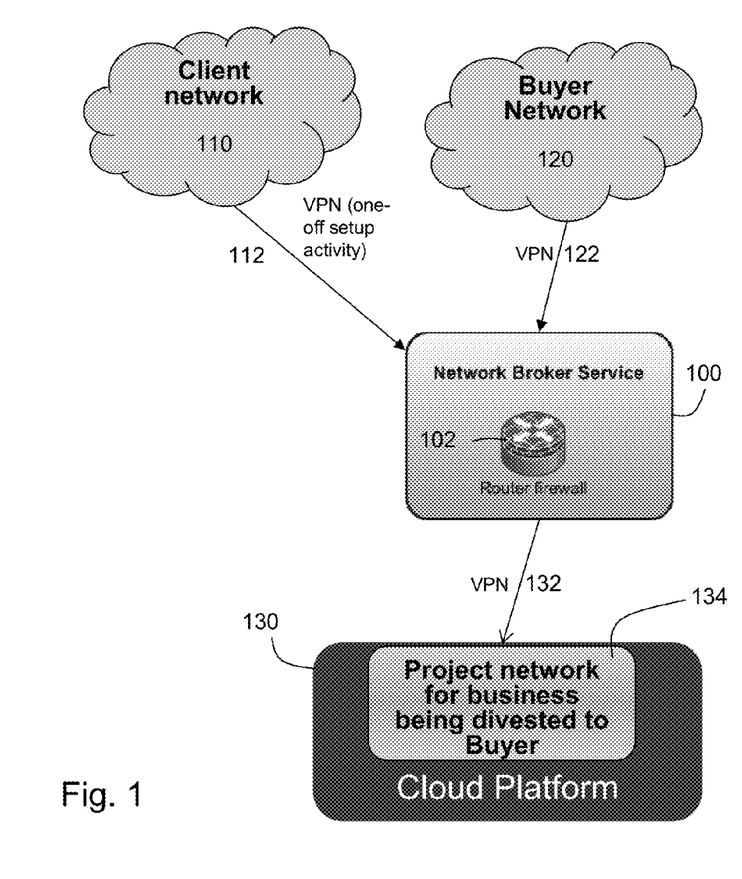
FIG. 1 shows schematically a first embodiment of a network intermediary between the parties to a transaction and a cloud services platform.

The inventors have addressed this problem by providing a network intermediary, or network broker, between the networks of each party to facilitate (i) connection to multiple cloud resources (which may include resources from different providers) through the same network connection and (ii) the separation and transfer of specific cloud resources between the two parties. This allows for a transfer of IT infrastructure between those parties. One embodiment of the invention is shown in FIG. 1. The transferring party 110 establishes a single network connection 112 to the network intermediary 100 (such as a VPN, a leased line, or a multiprotocol label switching (MPLS), connection). Depending on network performance and geographic requirements, the transferring party 110 may set up more than one such connection with the network intermediary 100. The network intermediary 100 has already established a connection 132 and cloud computer resource provisioning arrangements with one or more cloud providers 130. The network intermediary 100 may thereby provide a secure connection for the transferring party 110 to one or more cloud providers 130. In one embodiment, the network intermediary 100 has established such arrangements with a plurality of cloud providers, so that new or alternative cloud providers, resources, technologies, products, and services may be made available to the transferring party without that party needing to set up additional network connections for each. Instead, the network intermediary may be responsible for adding and maintaining connections to cloud service providers. Using the network connection 112 with the network intermediary 100, the transferring party may provision cloud computer resources with the IT infrastructure to be transferred. The IT infrastructure may include, for example, one or more of a processing resource, a storage resource, a network resource, an operating system, a software application, a software application configuration, state data, another type of data, and/or a combination thereof. The transferring party 110 may continue to be provided with access to the provisioned cloud resources 134 up until completion of the transaction, for example, to test the provisioned cloud resources and to ensure that they are maintained up to date. As network broker to the transaction, the network intermediary 100 manages and controls access to the provisioned cloud resources 134, since all access to them is through the network intermediary. In this embodiment, the access is controlled by configuring a firewall 102 appropriately to pass or reject incoming requests from the transferring party and the acquiring party. Up until completion of the transaction (or another point, if appropriate), the transferring party 110 retains access, after which the network intermediary 100 switches access from the transferring party to the acquiring party 120. The acquiring party 120 will preferably, by this stage, have established a network connection 122 to the network intermediary 100 (such as a VPN, a leased line, or a MPLS, connection). The acquiring party 120 may then transfer the acquired IT infrastructure provisioned in the cloud computer resources to its own internal network, or to another network environment, which may include one hosted by a cloud provider. The originally provisioned cloud resources 134 may then be decommissioned and the IP address range previously used for these resources made available for other transactions by the transferring party 110.

In this way, the setting up of a network connection to the network intermediary is a one-off step, so does not need to be performed each time a new transaction is to be effected. That is, rather than setting up new third party access (TPA) connections to every new transaction project environment, a single TPA connection is set up with the network intermediary (as if it were a project environment). After this connection is made, it is not necessary for any further TPA connections to be set up to support further transactions. This greatly simplifies the tracking and management of TPA connections and removes it from the critical path of projects that make use of multiple cloud resources and/or involve transfer of these resources between different parties. This allows for a greatly reduced time to utilisation of cloud computer resources. Furthermore, security concerns over the establishment of many network connections into an internal network (such as an entity's own private network) can be allayed, since only one network connection is required, to the network intermediary, and none is required directly from the entity to the many available cloud providers. A single connection to the network intermediary is easier to manage than multiple connections to multiple cloud service providers. Access to the cloud resources may only be via the network intermediary, so the network connection to the network intermediary may be the only connection which is required to comply with security policies, instead of the need to manage multiple, independent TPA points into the internal/corporate network of the entity. The internal network of the transferring party may be protected by the single network connection, being a VPN, MPLS, leased line, or other suitably secure, connection, depending on the requirements and policies of the transferring party.

Thus, a centralised system for securely connecting to multiple cloud providers may be provided, whereby a user of the network broker needs only a single network connection, and a single service agreement/contract, to be able to access many cloud service providers. The access to specific cloud resources may be switched on and off between the parties to a joint venture, acquisition, merger, divestiture or collaboration, in order to effect a transfer or sharing of IT infrastructure between the parties. The network broker is beneficial in providing increased separation between the transferring party and the acquiring party during a transaction.

Figure 2:
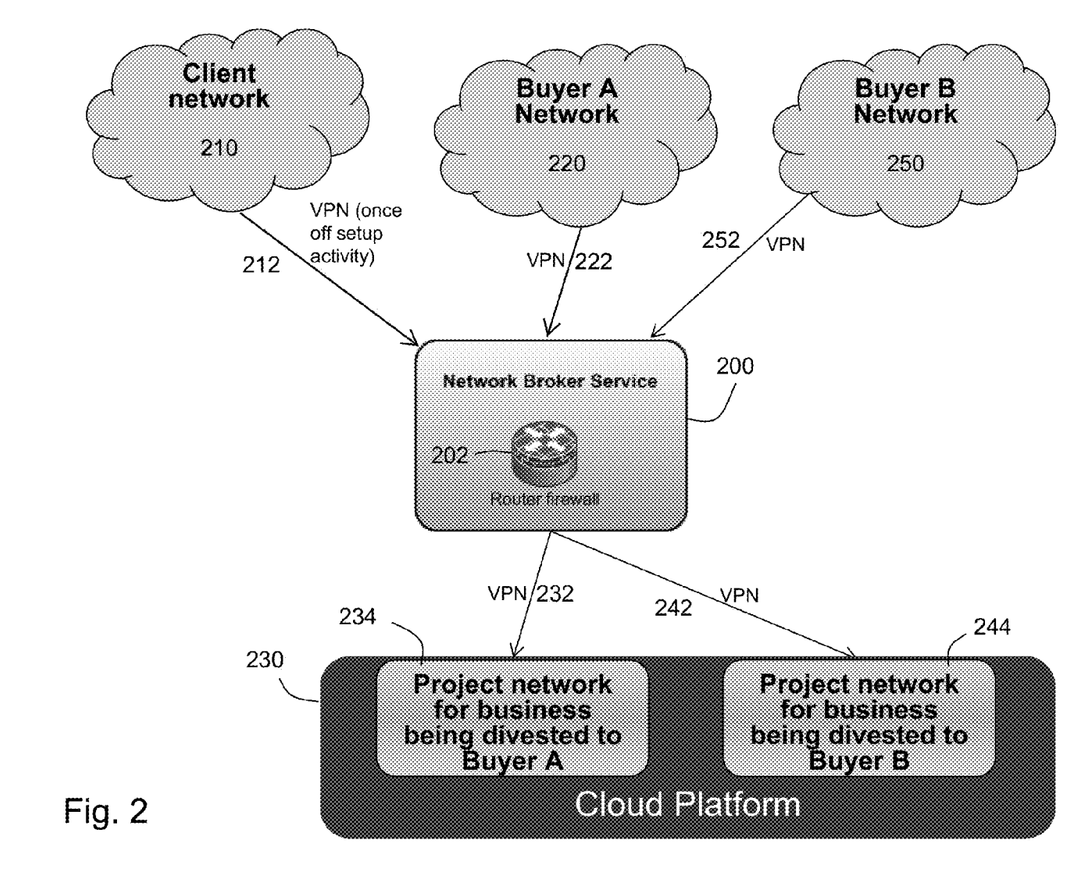
FIG. 2 shows schematically a second embodiment of a network intermediary between the parties to a plurality of transactions and a cloud services platform.

FIG. 2 shows another embodiment, in which the transferring, or divesting, party 210 wishes to effect multiple transactions using cloud services 230. The same, single network connection 212 with the network intermediary 200 is used by the transferring party 210 to provision a first cloud computer environment 234 and to provision a second cloud computer environment 244. The network intermediary 200 provisions the cloud environments 234, 244 using respective network connections 232, 242 with the cloud services platform 230. Access to the cloud environments 234, 244 by the transferring party 210 is enabled by suitable configuration of a firewall 202 of the network intermediary 200. When desired, for example at respective transaction completion, access to the first cloud environment 234 is permitted by the first acquiring party 220 using network connection 222 to the network intermediary 200 and access to the second cloud environment 244 is permitted by the second acquiring party 250 using network connection 252 to the network intermediary 200. These steps are effected by changing the configuration of the firewall 202 in this embodiment.

Figure 3:
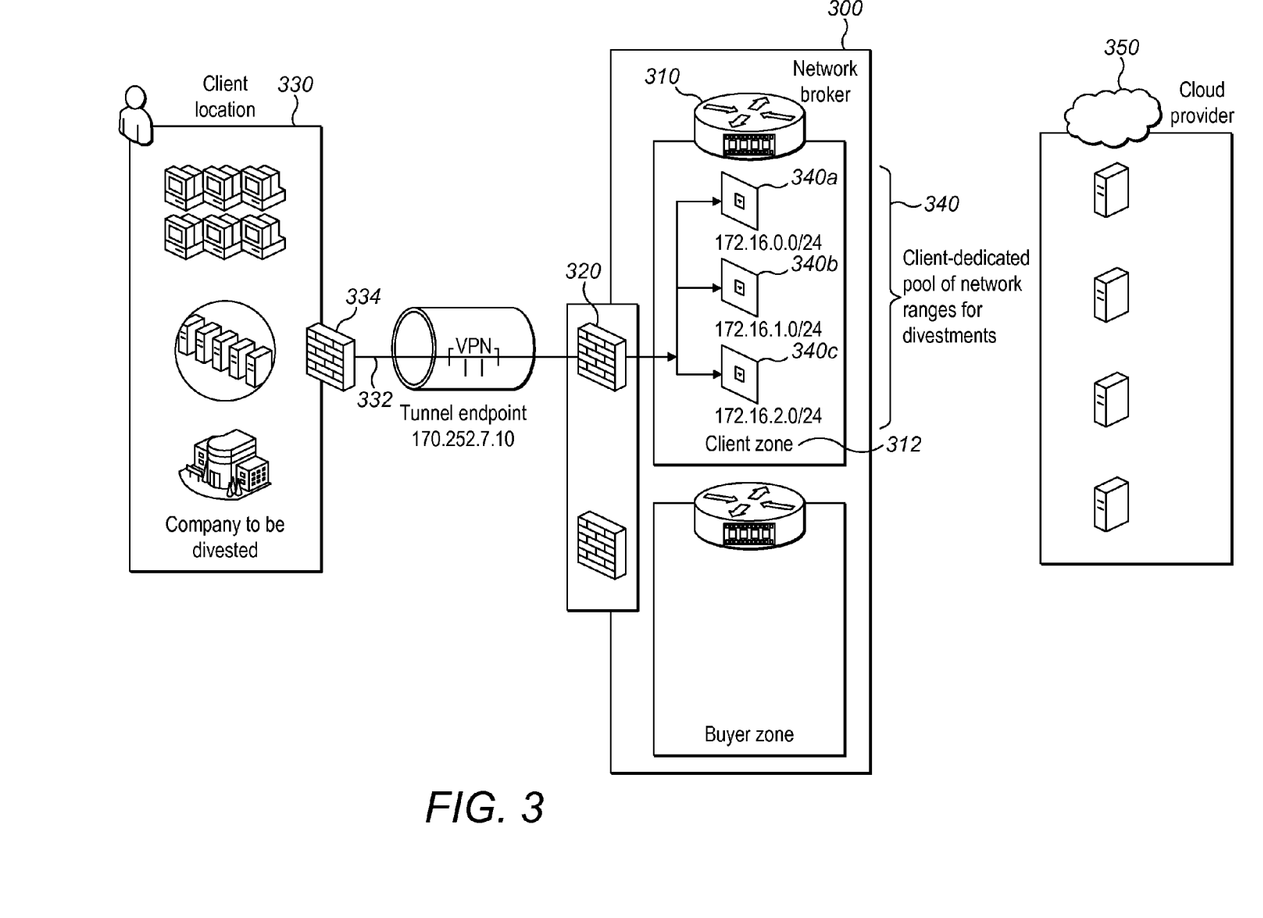
FIG. 3 shows schematically an embodiment of a network intermediary, at an initial connection stage.

FIG. 3 shows an embodiment of a network broker in more detail. The network broker, or network intermediary, 300 in this embodiment comprises a router component 310 and a packet filtering and/or inspecting component, such as a firewall, 320. The router component 310 may in some embodiments be provided by software running on a computer or on a server, but, especially for higher-demand applications, preferably comprises a stand-alone router device or system. The firewall 320 may be a program or a hardware device, with configurable parameters to restrict traffic to incoming traffic only and only from permitted users of the network broker system. The configurable parameters may be one or more of source IP addresses, ports and protocols. The router component 310 and the packet-filtering and/or inspecting component 320 may be provided together in a single device, or may be provided separately, depending on performance and security requirements.

A client 330 desiring to use the network broker 300 first sets up a network connection 332 with the network broker. The network connection 332 in this embodiment is a VPN connection, but it may alternatively comprise a leased line, a MPLS, or another suitably secure, connection. As is known, a VPN connection can provide a secure means of communication between remote sites or users, effectively providing a private communications network over a public network, such as the internet.

Although dependent upon the IT and security policies of the client 330, the client preferably has its own packet filtering and/or inspecting component, or firewall, 334. The firewall 334 can be configured to secure the third party access point established by the network connection 332. In particular, the firewall 334 may be configured to permit only outbound traffic through and may have IP address, port, and protocol parameters restricted only to those to be used with the network broker 300. In this way, preferably for both the network broker firewall 320 and the client firewall 334, only a 'baseline' set of ports and protocols required to complete the set up of the connection between the network broker 300 and the client 330 are configured. Furthermore, connections may only be initiated from the client 330 to the network broker 300; connection initiation may not be permitted from the network broker to the client.

As part of the connectivity set up for the client 330, a client zone 312 is established at the network intermediary 300, with a dedicated range 340 of IP addresses for the client to use for accessing and provisioning cloud services 350. The IP address space, or range, 340 may be specified by the client itself or by the network broker, depending on requirements and availability. The size of the range 340 allocated to any particular client will of course depend on the expected extent of use of the network broker 300, which in turn depends on the number and frequency of divestment transactions involving IT infrastructure the client typically engages in. While the IP address allocation is effectively a one-off step, similar to the setting up of the network connection 332, routine evaluation of the usage of the IP address range 340 allocated to the client 330 can lead to additional or fewer IP addresses (a larger or smaller IP address space) being allocated to the client. The address range 340 is configured using firewall rules to prevent routing between client-dedicated subnet ranges.

In this embodiment, the IP address range 340 allocated to the client 330 comprises three dedicated IP addresses 340a-c. The three IP addresses 340a-c, in this embodiment, are private subnet addresses having a 24-bit subnet mask. They are therefore not accessible to unauthorised parties over public networks, such as the internet. Only the authorised client 330 can establish a secured network connection 332 with the network broker 300 (for example, using known VPN tunnelling/encapsulation protocols to the tunnel endpoint at the network access server, or media gateway, of the network broker) which will be permitted past the network broker firewall 320, to be able to reach one or other of the IP addresses 340a-c allocated to the client.

Figure 4:
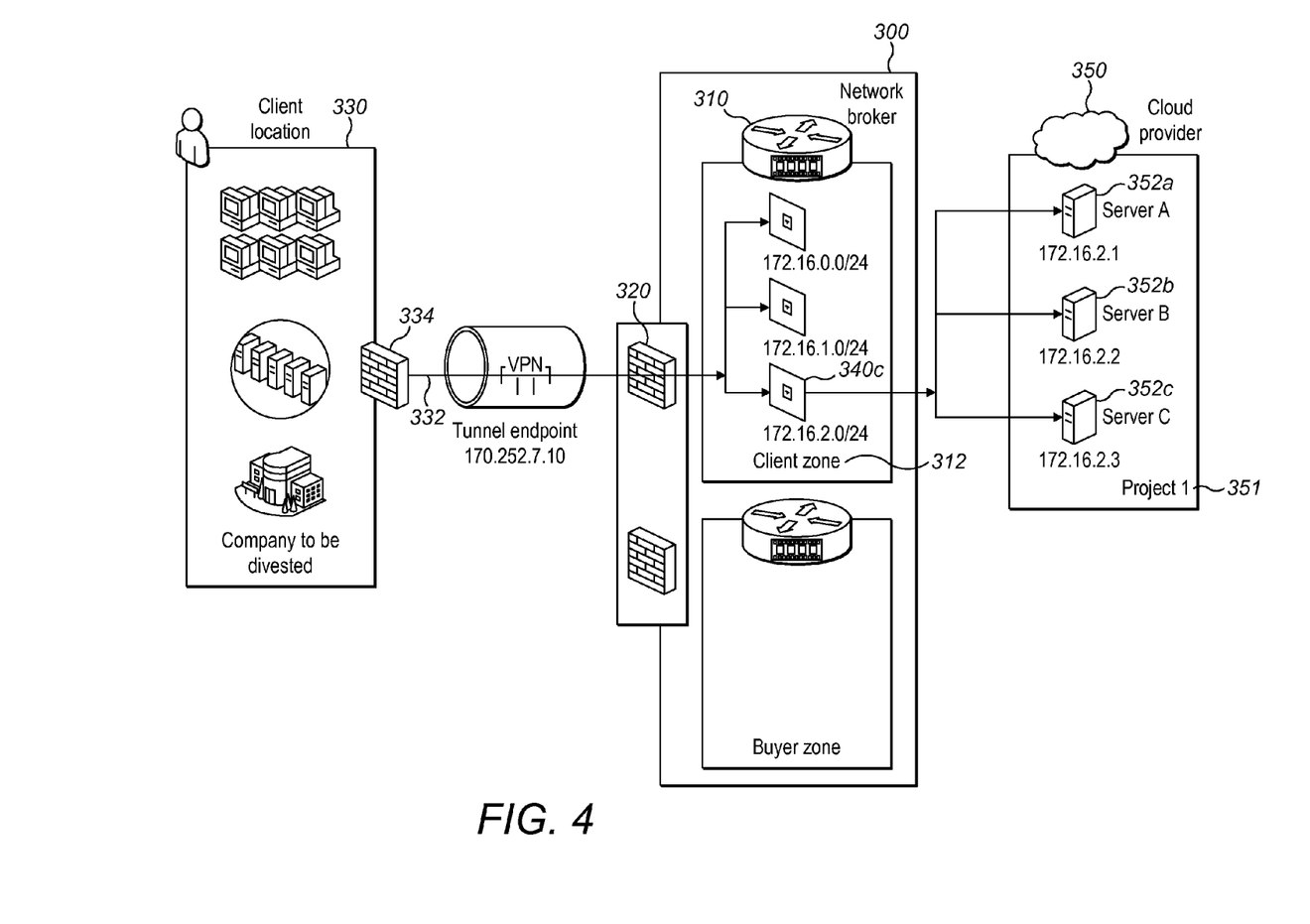
FIG. 4 shows schematically an embodiment of a network intermediary, at a cloud provisioning stage.

Using one of the subnets 340a-c, the client 330 is able to provision one or more cloud computer resources as one or more hosts, or nodes, 352, as shown in FIG. 4. The client 330 establishes a network connection 332 with the network broker 300, selecting one subnet 340c of the subnets 340 allocated to the client (in this example, at IP subnet address 172.16.2.0/24). The client 330 selects one or more cloud resources 350 to be provisioned with the IT infrastructure to be transferred. In the embodiment shown in FIG. 4, a first project zone 351 is set up, with three cloud servers A-C which may be respectively provisioned as a first cloud computer resource host 352a (at IP address 172.16.2.1), a second cloud computer resource host 352b (at IP address 172.16.2.2), and a third cloud computer resource host 352c (at IP address 172.16.2.3). Of course, the choice of subnet and the extent of the cloud computer resources required to be provisioned will vary depending on the circumstances and requirements of the transaction being implemented.

Thus, as part of the divestment preparation, the cloud resources (servers, infrastructure, applications, data, etc.) are provisioned and configured using one of the subnets 340 allocated to the client 330 using the network broker 300 to provide the network connection. In order to ensure correct routing of traffic from the client, the access to the cloud resources is preferably provided by pass-through routing. That is, in this embodiment, there is no network address translation (NAT) by the network broker 300; rather, the intended host IP address in the cloud is maintained unchanged in the packets which are received by the network broker 300. Following provisioning of the cloud resources, client access to the resources through the network connection 332 and the network broker 300 is tested and verified.

Since the network connection 332 from the client 330 to the network broker 300 is set up as a one-time procedure, it can be seen that the use of cloud services through the network broker 300 has led to a decreased time to effect the transitioning of the IT infrastructure out of the client network. All network connectivity, code of conduct agreements etc. have been addressed as part of the initial set up with the network broker 300. Thus, access to and use of the cloud resources may take place as soon as a new transaction project is initiated.

Figure 5:
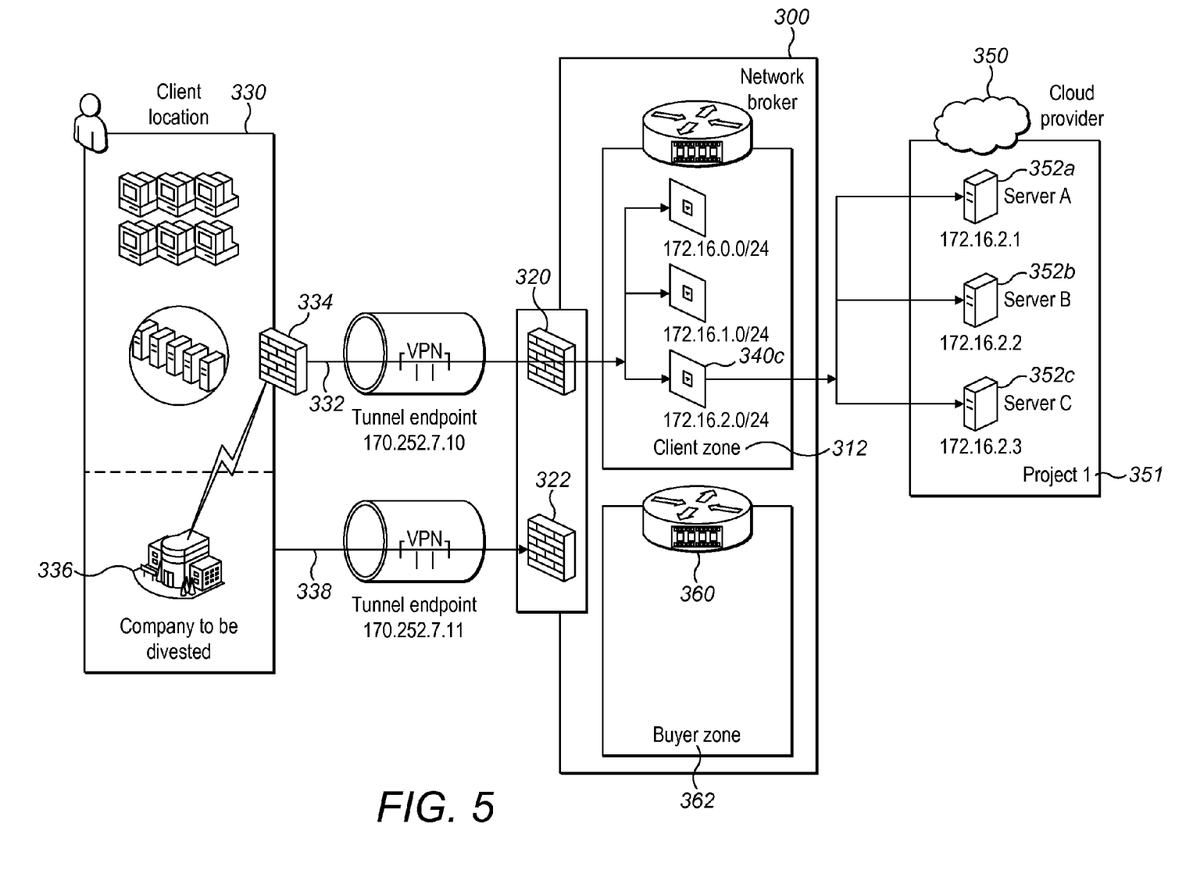
FIG. 5 shows schematically an embodiment of a network intermediary, just prior to the network cutover stage.

Referring to FIG. 5, while the transition of IT infrastructure from the client 330 to the cloud takes place and testing of the provisioned data, applications etc. continues to take place, the network broker 300 establishes a network connection 338 with the company/entity 336 which is to be divested, in preparation for cutover. In the preferred embodiment, this is provided as a VPN connection. A network broker firewall 322 is configured to permit incoming access from the entity 336 only.

Figure 6:
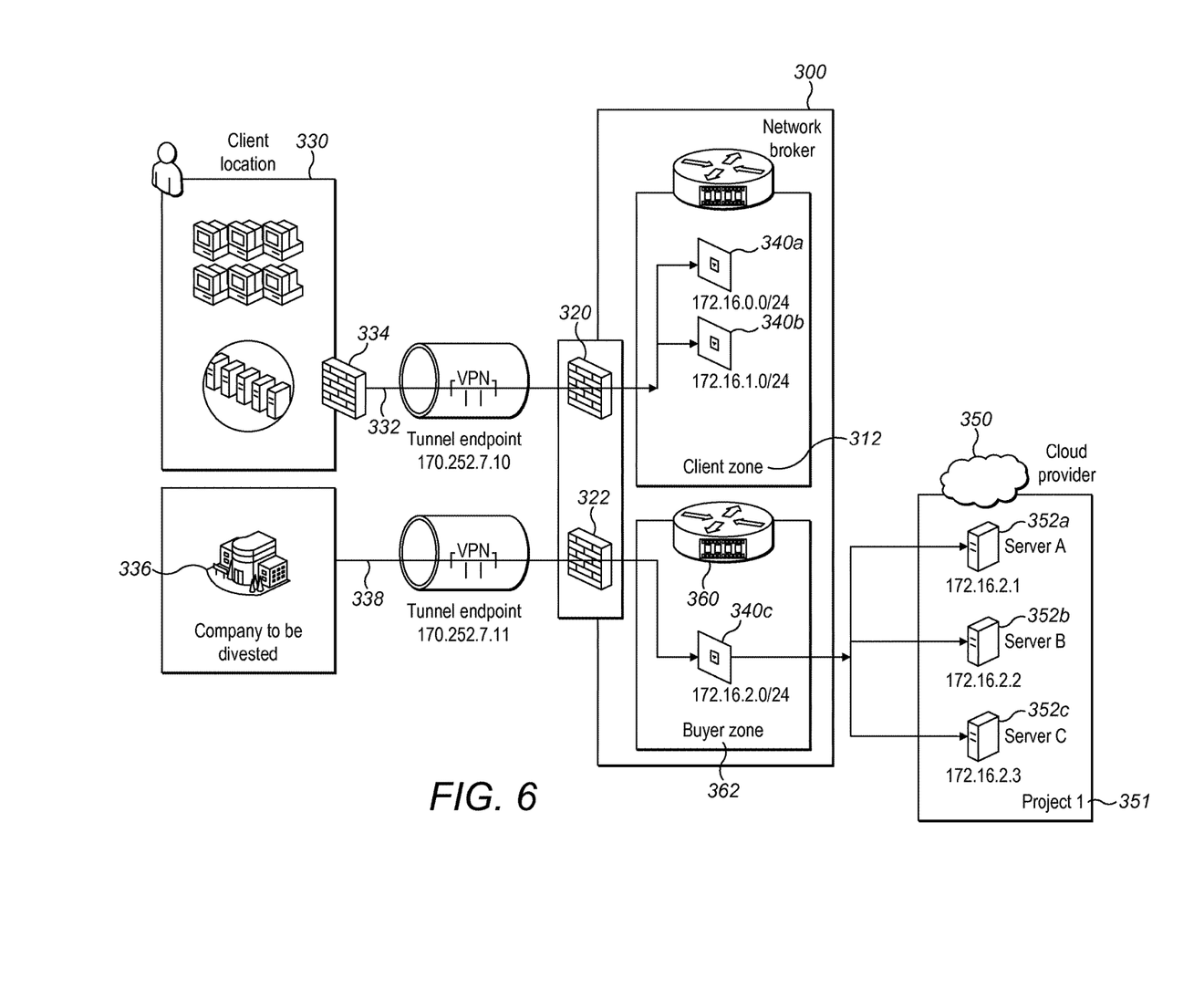
FIG. 6 shows schematically an embodiment of a network intermediary, at a network cutover stage.

Referring to FIG. 6, the network connection 338 is established into a buyer zone 362 at the network intermediary 300, for access to the cloud resources being divested once the transaction is completed (i.e., at cutover). To ensure a smooth transition, the second network connection 338 is tested and verified.

In readiness for cutover, the client prepares its infrastructure to cut off the divested asset/entity 336 from the client's information systems. This step may be performed by the internal network team of the client 330, by its network provider, and/or by an external team. The entity 336 still maintains connectivity with the provisioned cloud resources during this stage, through the client's network connection 332 with the network broker 300.

At cutover, the network provider of the client 330 removes access to the client network from the divested entity 336. The network broker 300 blocks access to the cloud resources in the first project zone 351 by the client 330, by changing the configuration of the firewall 320. This is achieved in this embodiment by blocking access to the particular subnet address 340c for incoming traffic from the client 330 using firewall rules in firewall 320. No modification of the third party access configuration for the network connection 332 is required by the client 330. The client 330 may continue to access other IP address space (e.g., subnets 340a, 340b) allocated to the client, to handle other divestment transactions, for example, since the remaining available IP address space is not blocked by the firewall settings. Thus, settings for VPN tunnelling, leased lines etc. remain unchanged.

When the firewall 320 settings are changed to block the client 330 from accessing the cloud resources for the first project 351, the settings for the firewall 322 (which of course could be provided by the same firewall as firewall 320, in some embodiments) are changed to permit access to those cloud resources by the divested entity 336 over the second network connection 338. The network broker 300 configures the divested network infrastructure to send all network traffic from the divested entity 336 to the resources in the cloud.

Following cutover, the new owner of the divested entity 336 may begin assimilating the IT infrastructure from the cloud host(s) 352 into its own network. Once this process is completed, the provisioned cloud servers in the first project zone 351 are no longer required and may be decommissioned, ready for use again for other projects.

Figure 7:
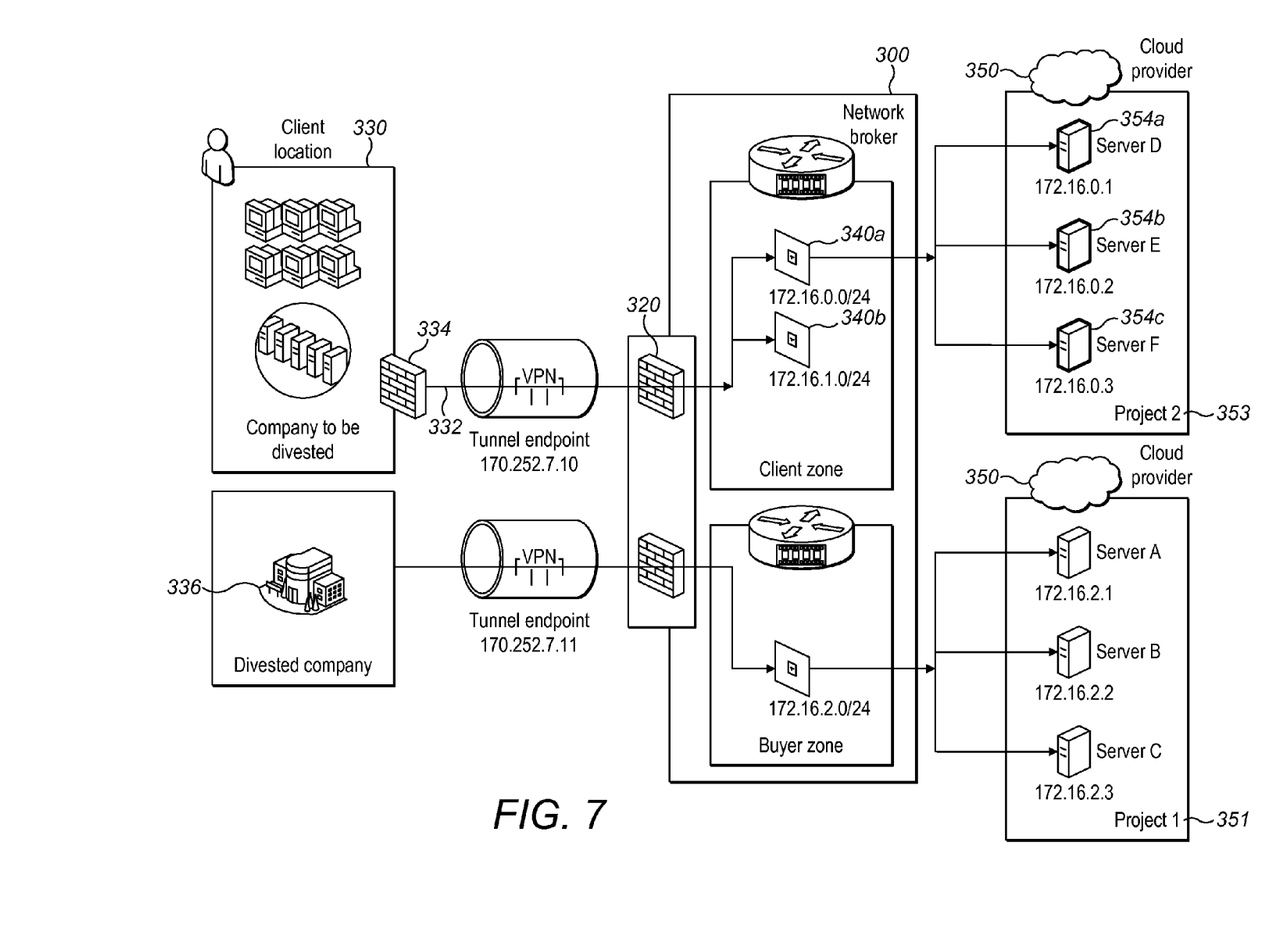
FIG. 7 shows schematically an embodiment of a network intermediary handling additional IT infrastructure transfer projects.

As mentioned above, although access to the subnet 340c relating to the divested asset is blocked for the client 330 on cutover, the client may continue to access other subnets 340a,b allocated to it. FIG. 7 shows an example of this. The client 330, still using the single network connection 332 to the network broker 300 as before, selects another subnet 340a (in this embodiment, at address 172.16.0.0/24) to use to provision cloud resources with IT infrastructure relating to a second transaction project 353. The client 330 selects one or more cloud resources 350 to be provisioned with the IT infrastructure to be transferred. In the embodiment shown in FIG. 7, a second project zone 353 is set up, with three cloud servers D-F which may be respectively provisioned as a fourth cloud computer resource host 354a (at IP address 172.16.0.1), a fifth cloud computer resource host 354b (at IP address 172.16.0.2), and a sixth cloud computer resource host 354c (at IP address 172.16.0.3). Of course, the choice of subnet and the extent of the cloud computer resources required to be provisioned will vary depending on the circumstances and requirements of the transaction being implemented in the second project. The subsequent steps of the divestment process follow a similar sequence as above for the first project 351.

Figure 8:
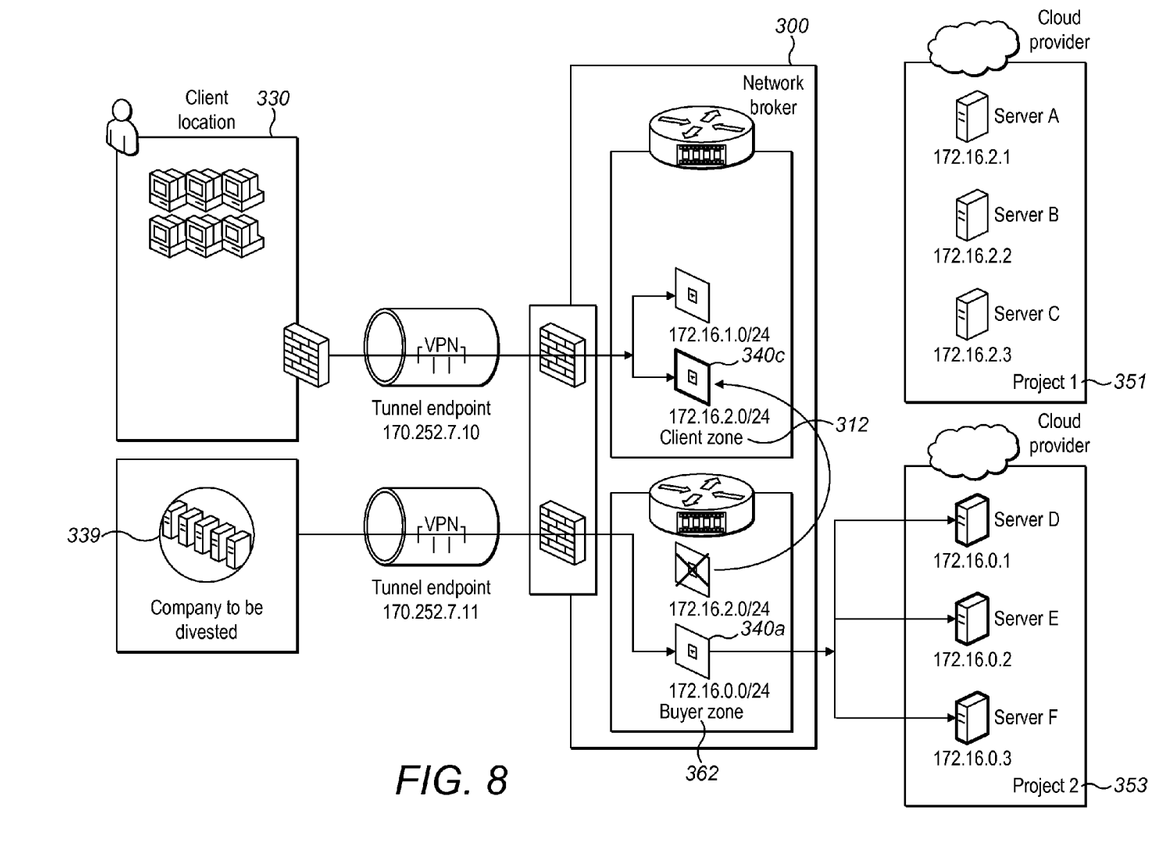
FIG. 8 shows schematically an embodiment of a network intermediary, at a network range recycling stage.

FIG. 8 shows a stage after cutover for the second project 353. The second project 353 may relate to a different entity 339 to be divested. Following cutover, that entity 339 is provided with access to the subnet 340a through configurational changes in the firewall to the network broker 300. In other words, the subnet 340a has been transferred from the client zone 312 to the buyer zone 362 of the network broker 300. Access to the provisioned cloud resources is therefore permitted by the divested entity 339, for assimilation by its new owner.

FIG. 8 also shows the recycling of the subnet 340c used for the first project 351 transaction. Although this is shown in FIG. 8 with details of the second project 353, it will be readily understood that this process is entirely independent of and unrelated to the second project 353. Servers A-C which were allocated and/or provisioned for implementing the first project 351 transaction are no longer needed and therefore can now be decommissioned as hosts 352 for the first project 351, ready for re-use in further cloud service applications. Furthermore, the subnet 340c address range which was taken up by the first project 351 is now available again and is moved out of the buyer zone 362 back into the client zone 312, ready to be selected by the client 330 for a new project. As part of this process, the access to this range of IP addresses is blocked for the divested entity 336 and permitted again for the client 330, by changing the firewall configuration, as discussed above. Again, no third party access or other configurational changes are required on the part of the client 330 to enable the re-allocation of the network range back to the client; this is handled by the network broker 300. The recycling of the network ranges may be performed by the network broker 300 as soon as the network range becomes available again, or after a certain number of projects have been completed, depending on the availability of other network ranges for any particular client. Recycling the network ranges in this way allows a client to perform further divestment projects using the network broker without needing to establish a new network connection to the network broker or modify the client's routing or VPN, for example, configurations.

Figure 9:
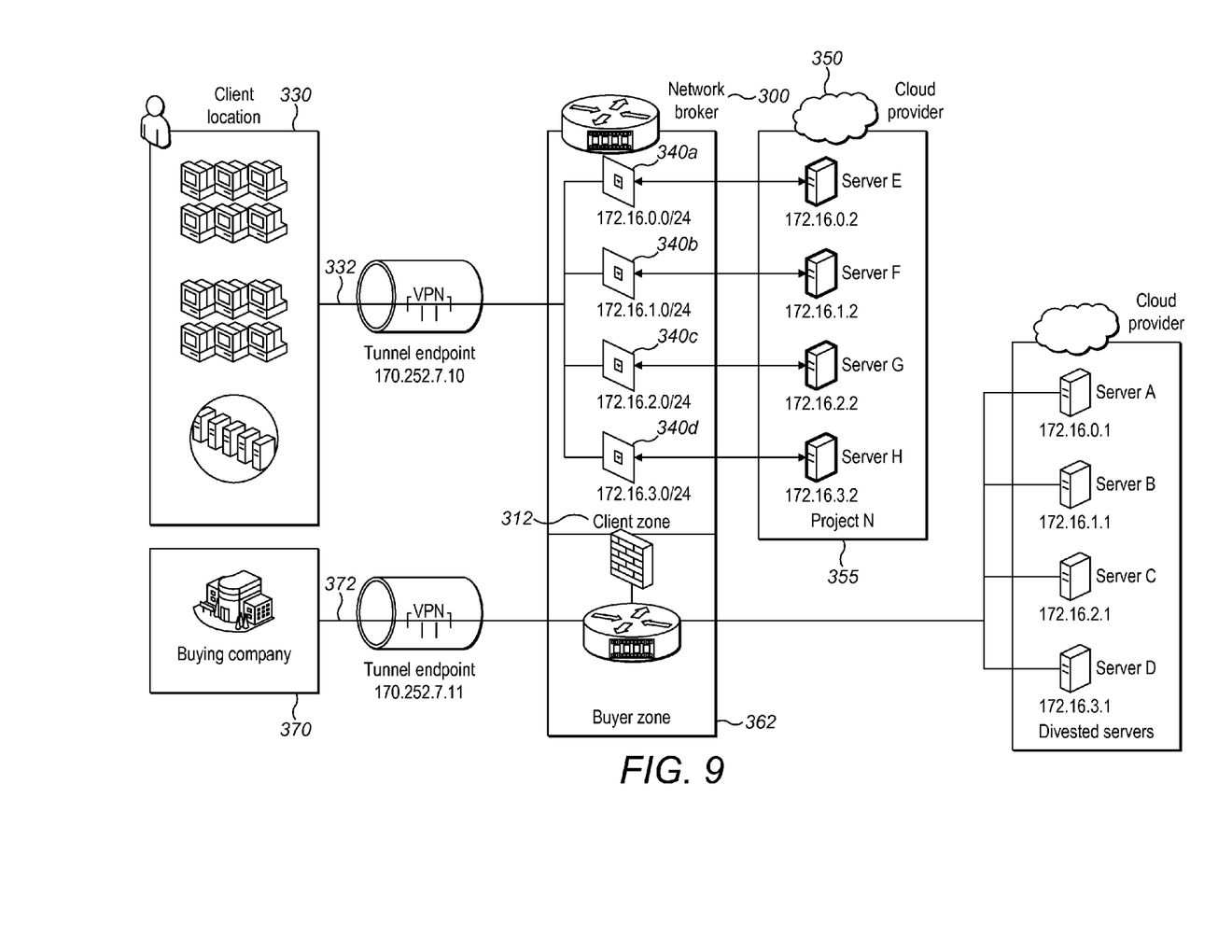
FIG. 9 shows schematically an embodiment of a network intermediary handling (i) one party who is connecting to multiple cloud resources (including resources from different providers) through the same network connection, and is running additional projects whose infrastructure may be transferred to another party in the future, and (ii) another party who is connecting to multiple cloud resources which were previously part of the other party's network, and (iii) each party having the ability to separate/disconnect from selected cloud resources and/or transfer the connection to another party.

FIG. 9 shows an embodiment in which the client 330 is performing multiple divestment activities at the same time. Because the network range allocated to the client 330 is divided up into a number of subnets 340a-d (four IP address sub-spaces formed from the IP address space allocated to the client, in the embodiment of FIG. 9), the client 330 is able to transition IT infrastructure relating to multiple divestment projects to respective, selected subnets 340a-d in parallel. The respective host(s) at the cloud servers E-H can therefore be provisioned in parallel, because of the division of the client's network range into separate subnets. The same general steps of the provisioning, testing, cutover, decommissioning and recycling processes discussed above may be followed in this embodiment, with the multiple divestment projects taking place in parallel.

Thus, it can be seen that the network broker 300 acts as a service switch to control access to the different portions of the cloud environment between a transferring entity (client, or seller) and an acquiring entity (divestment entity and/or buyer). Of course, the above embodiments relate to divestments in which the transferring party no longer has an interest in the divested IT infrastructure assets upon completion of the transaction. In transactions where this is not the case, such as in collaboration or joint venture projects, the access configuration for both or all parties to such projects may be suitably set to allow shared access to the cloud-provisioned infrastructure.

In accordance with another aspect of the invention, a method is provided comprising: dividing IP address space into a plurality of subnets usable by a client for a plurality of transactions to be conducted over a cloud computing environment; setting up a first link between the client and a network broker, the link being usable to transfer data destined to the IP address space and being used to provide connectivity between the client and a plurality of cloud providers through the network broker; provisioning IT infrastructure to be divested by the client onto one or more of the plurality of subnets in a cloud computing environment via the network broker; setting up a second link in parallel between the client and the network broker, the second link being usable to provide connectivity to the IT infrastructure to be divested by the client via the network broker to the cloud computing environment; severing access between the client and the IT infrastructure to be divested by rerouting, at the network broker, traffic destined to the one or more subnets hosting the IT infrastructure to be divested from the first link to the second link; providing access to a new owner of the divested IT infrastructure through the second link via the network broker; and upon completion of a divestment process, adjusting routing rules within the network broker to sever access of the new owner to the one or more subnets hosting the IT infrastructure that has been divested and to renew access for the client to the one or more subnets that now formerly hosted the IT infrastructure that has been divested.

Figure 10:
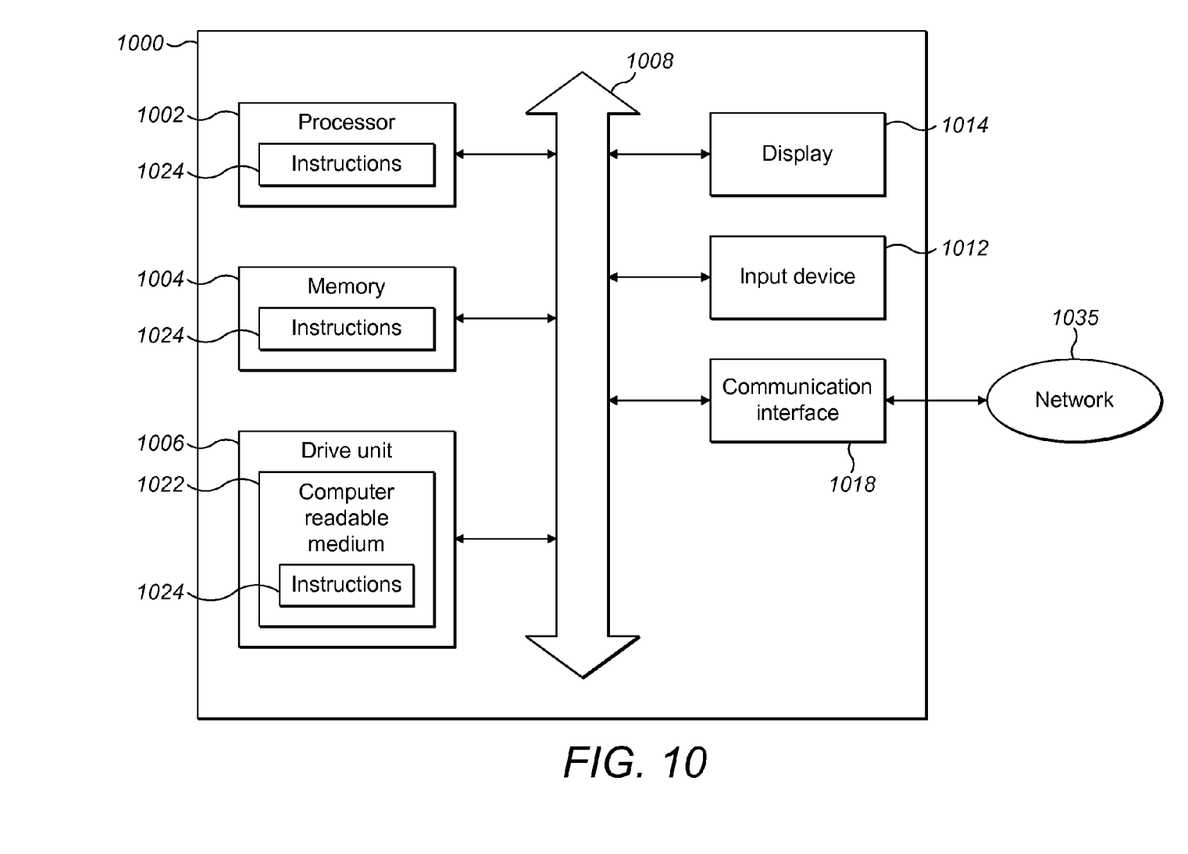
FIG. 10 shows an exemplary general purpose computer system upon which embodiments of the invention may be implemented.

FIG. 10 shows schematically an exemplary general purpose computer system 1000 which may be used in embodiments of the invention. The computer system 1000 may include a processor 1002, such as, a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1004 may include a cache or random access memory for the processor 1002. Alternatively or in addition, the memory 1004 may be separate from the processor 1002, such as a cache memory of a processor, the system memory, or other memory. The memory 1004 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1004 may be operable to store instructions 1024 executable by the processor 1002. The functions, acts or tasks illustrated in the figures or described herein may be performed by the programmed processor 1002 executing the instructions 1024 stored in the memory 1004. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1000 may further include a display 1014, such as a liquid crystal display (LCD), an organic light emitting diode (OLED), a flat panel display, a solid state display, a cathode ray tube (CRT), a projector, a printer or other now known or later developed display device for outputting determined information. The display 1014 may act as an interface for the user to see the functioning of the processor 1002, or specifically as an interface with the software stored in the memory 1004 or in the drive unit 1006.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the system 1000.

The computer system 1000 may also include a disk or optical drive unit 1006. The disk drive unit 1006 may include a computer-readable medium 1022 in which one or more sets of instructions 1024, e.g. software, can be embedded. Further, the instructions 1024 may perform one or more of the methods or logic as described herein. The instructions 1024 may reside completely, or at least partially, within the memory 1004 and/or within the processor 1002 during execution by the computer system 1000. The memory 1004 and the processor 1002 also may include computer-readable media as discussed above.

The present disclosure contemplates a computer-readable medium 1022 that includes instructions 1024 or receives and executes instructions 1024 responsive to a propagated signal; so that a device connected to a network 1035 may communicate voice, video, audio, images or any other data over the network 1035. Further, the instructions 1024 may be transmitted or received over the network 1035 via a communication interface 1018. The communication interface 1018 may be a part of the processor 1002 or may be a separate component. The communication interface 1018 may be created in software or may be a physical connection in hardware. The communication interface 1018 may be configured to connect with a network 1035, external media, the display 1014, or any other components in system 1000, or combinations thereof. The connection with the network 1035 may be a physical connection, such as a wired Ethernet connection or may be established wirelessly as discussed below. Likewise, the additional connections with other components of the system 1000 may be physical connections or may be established wirelessly.

The network 1035 may include wired networks, wireless networks, or combinations thereof. The wireless network may be a cellular telephone network, an 802.11, 802.16, 802.20, or WiMax network. Further, the network 1035 may be a public network, such as the Internet, a private network, such as an intranet, or combinations thereof, and may utilize a variety of networking protocols now available or later developed including, but not limited to TCP/IP based networking protocols.

The computer-readable medium 1022 may be a single medium, or the computer-readable medium 1022 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform anyone or more of the methods or operations disclosed herein.

The computer-readable medium 1022 may include a solid state memory such as a memory card or other package that houses one or more non-volatile read-only memories. The computer-readable medium 1022 also may be a random access memory or other volatile re-writable memory. Additionally, the computer-readable medium 1022 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A method of transferring IT infrastructure resources from a first entity to a second entity, comprising:
    providing an intermediary entity having a network address that belongs to a same subnet as one or more cloud computer resources to facilitate access to one or more cloud computer resources;
    configuring a firewall of the intermediary entity to provide a first client address to the first entity and a second client address that is different from the first client address to the second entity;
    creating, by the intermediary entity, a first route between the first client address and the network address to thereby facilitate access, by the first entity, to the one or more cloud computer resources;
    receiving, by the intermediary entity, provisioning data, from the first entity and via the first client address, for provisioning IT infrastructure resources associated with the first entity on the one or more cloud computer resources;
    forwarding, by the intermediary entity, the provisioning data to the one or more cloud computer resources via the network address to thereby provision the IT infrastructure of the first entity on the cloud computer resources;
    facilitating, by the intermediary and via the first client address, access by the first entity to the IT infrastructure provisioned on the cloud computer resources;
    removing the first route to thereby prevent access by the first entity to the IT infrastructure provisioned on the cloud computer resources;
    creating, by the intermediary entity, a second route between the second client address and the network address to thereby facilitate access by the second entity to the IT infrastructure provisioned on the cloud computer resources by the first entity; and
    facilitating, by the intermediary and via the second client address, access by the second entity to the IT infrastructure provisioned on the cloud computer resources.

2. The method of claim 1, wherein access to the provisioned cloud computer resources is controlled by the intermediary entity.

3. The method of claim 1, wherein the intermediary entity has access to a plurality of cloud providers and the first entity is provided with access to the plurality of cloud providers using the first network connection to the intermediary entity.

4. The method of claim 1, wherein the first network connection connects the first entity to a first entity network portion of the intermediary entity.

5. The method of claim 4, wherein the first entity network portion comprises a plurality of first entity network addresses and the first entity provisions the one or more cloud computer resources with the first computer resources using a first network address of the plurality of first entity network addresses.

6. The method of claim 1, wherein the second network connection connects the second entity to a second entity network portion of the intermediary entity.

7. The method of claim 5, wherein the second network connection connects the second entity to a second entity network portion of the intermediary entity; and
wherein the second entity is provided with access to the provisioned cloud computer resources by the intermediary entity transferring access to the first network address from the first entity network portion to the second entity network portion.

8. The method of claim 1, wherein access to the provisioned cloud computer resources is transferred from the first entity to the second entity by the intermediary entity providing a first firewall configuration between the first entity and the intermediate entity and providing a second firewall configuration between the second entity and the intermediary entity.

9. The method of claim 1, wherein access of the first entity to the provisioned cloud computer resources is prevented using a firewall configuration between the first entity and the intermediary entity.

10. The method of claim 7, wherein, when access to the provisioned cloud computer resources is no longer required, access to the first network address is transferred back from the second entity network portion to the first entity network portion.

11. The method of claim 1, wherein the first entity provisions the one or more cloud computer resources with second computer resources using the first network connection to provide second provisioned cloud computer resources for transfer to a third entity.

12. The method of claim 1, wherein the first entity separates and disconnects from the provisioned cloud computer resources while maintaining access using the first network connection to provision other existing or additional cloud computer resources.

13. A system comprising an intermediary entity comprising a processor and a memory, the memory comprising instructions which when executed implement a method of transferring IT infrastructure resources from a first entity to a second entity, the method comprising:
providing the intermediary entity with a network address that belongs to a same subnet as one or more cloud computer resources to facilitate access to one or more cloud computer resources;
configuring a firewall of the intermediary entity to provide a first client address to the first entity and a second client address that is different from the first client address to the second entity;
creating a first route between the first client address and the network address to thereby facilitate access by the first entity, to the one or more cloud computer resources;
receiving provisioning data, from the first entity and via the first client address, for provisioning IT infrastructure resources associated with the first entity on the one or more cloud computer resources;
forwarding the provisioning data to the one or more cloud computer resources via the network address to thereby provision the IT infrastructure of the first entity on the cloud computer resources;
facilitating, by the intermediary and via the first client address, access by the first entity to the IT infrastructure provisioned on the cloud computer resources;
removing the first route to thereby prevent access by the first entity to the IT infrastructure provisioned on the cloud computer resources
creating, by the intermediary entity, a second route between the second client address and the network address to thereby facilitate access by the second entity to the IT infrastructure provisioned on the cloud computer resources by the first entity; and
facilitating, by the intermediary and via the second client address, access by the second entity to the IT infrastructure provisioned on the cloud computer resources.

14. The system of claim 13, the memory further comprising instructions which when executed implement a method according to claim 7.

15. A product comprising a computer readable memory with processor executable instructions stored thereon, wherein the instructions when executed by the processor cause the processor to carry out the method of claim 1.

16. A method of controlling access to cloud computing resources comprising:
provisioning, with an intermediary entity, one or more cloud computer resources via a network address that belongs to a same subnet as one or more cloud computer resources to facilitate to thereby provide provisioned cloud computer resources;
configuring a firewall of the intermediary entity to provide a first client address to the first entity and a second client address that is different from the first client address to the second entity;
creating, by the intermediary entity, a first route between the first client address and the network address to thereby facilitate provisioning, by the first entity, IT infrastructure on the one or more cloud computer resources;
removing the first route to thereby prevent access by the first entity to the IT infrastructure provisioned on the cloud computer resources;
creating, by the intermediary entity, a second route between the second client address and the network address to thereby facilitate access by the second entity to the IT infrastructure provisioned on the cloud computer resources by the first entity.

* * * * *